Oct. 14, 1941.  K. W. McMILLER  2,258,710
RAKE-CLEANING ATTACHMENT
Filed March 19, 1940  2 Sheets-Sheet 1
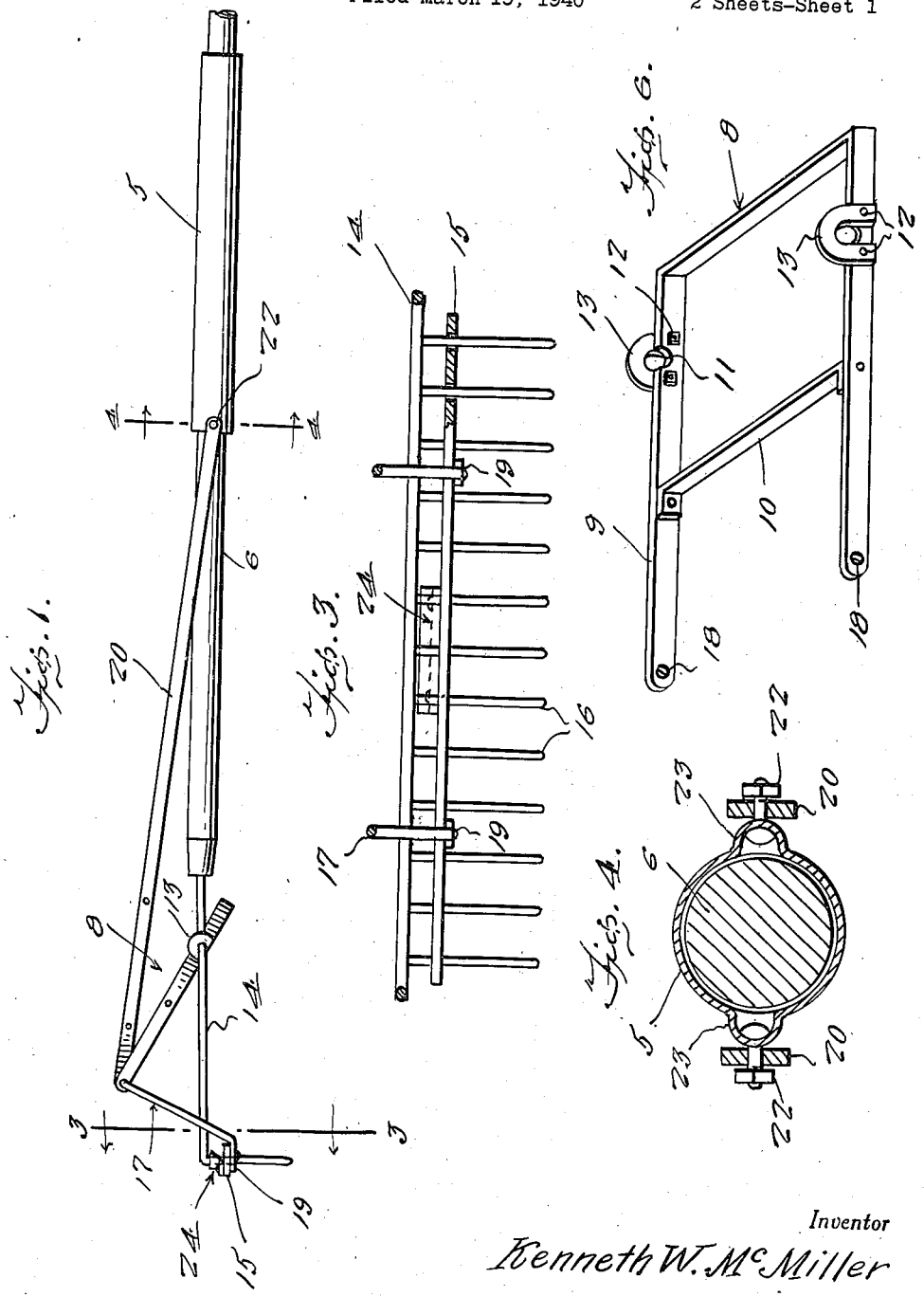
Inventor
Kenneth W. McMiller
By Clarence A. O'Brien
Attorney Oct. 14, 1941.   K. W. McMILLER   2,258,710
RAKE-CLEANING ATTACHMENT
Filed March 19, 1940   2 Sheets-Sheet 2
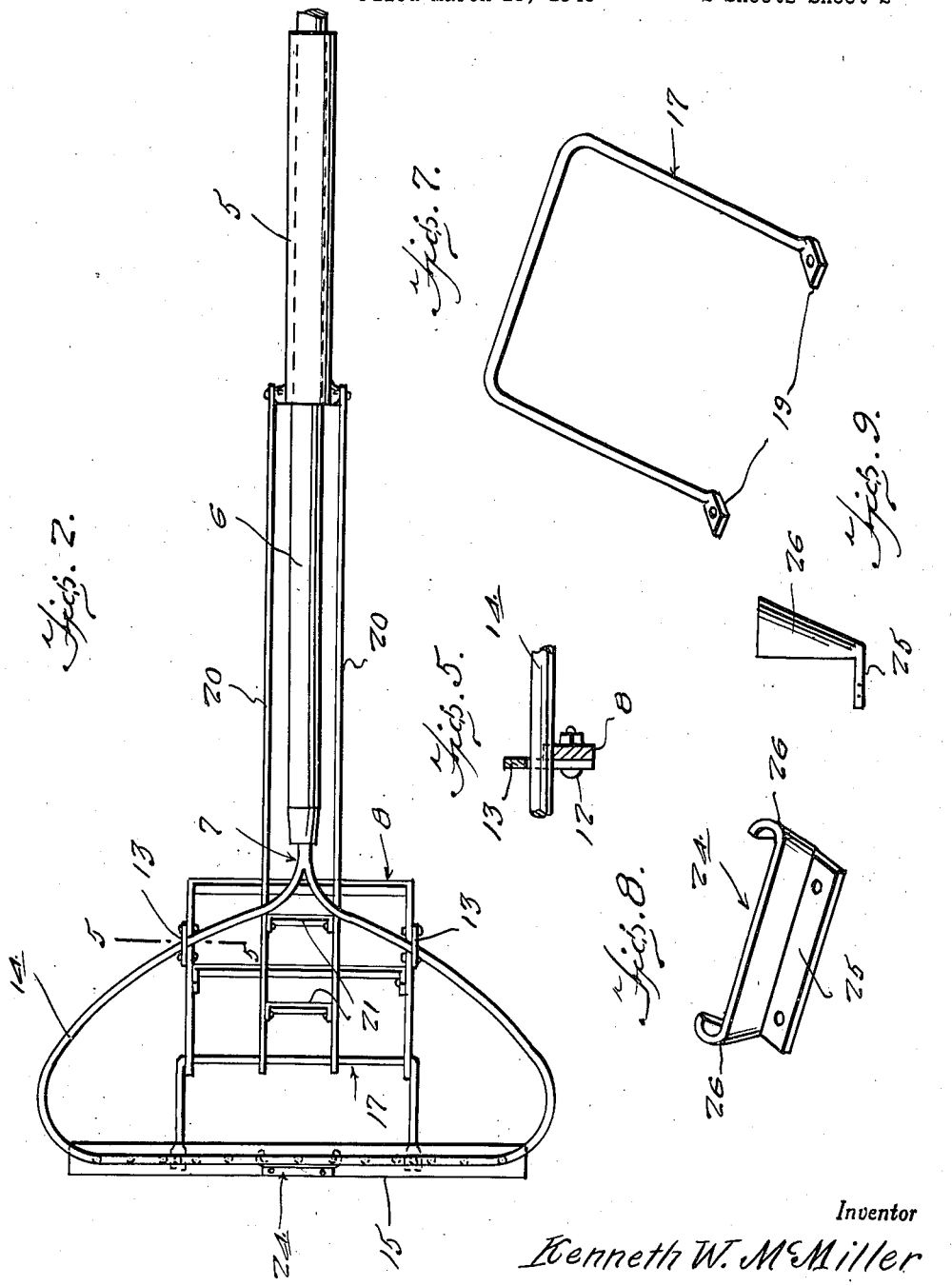
Inventor
*Kenneth W. McMiller*
By *Clarence A. O'Brien*
Attorney Patented Oct. 14, 1941

2,258,710

UNITED STATES PATENT OFFICE 2,258,710

RAKE-CLEANING ATTACHMENT

Kenneth W. McMiller, Hancock, Wis.

Application March 19, 1940, Serial No. 324,875

3 Claims. (Cl. 56—400.10)

This invention relates broadly to garden rakes, and more particularly to an attachment therefor to facilitate cleaning the tines of the rake.

In accordance with the present invention a simple, efficient mechanism is provided that can be readily applied to the rake and easily operated for clearing the teeth of the rake of accumulated leaves, grass, twigs and the like, as generally result from the ordinary use of the rake.

The invention, together with its objects and advantages will be best understood from a study of the followinging description taken in connection with the accompanying drawings wherein:

Figure 1 is a side elevational view of a rake illustrating the application of the invention thereto.

Figure 2 is a top plan view of the rake with the attachment associated therewith.

Figures 3 and 4 are sectional views taken substantially on the lines 3—3 and 4—4, respectively, of Figure 1.

Figure 5 is a detail sectional view taken substantially on the line 5—5 of Figure 2.

Figure 6 is a perspective view of a frame forming part of the invention.

Figure 7 is a perspective view of a U-shaped pusher rod.

Figure 8 is a perspective view of a guide member, and

Figure 9 is an end elevational view of the guide member.

Referring more in detail to the drawings it will be seen that the rake cleaner attachment, in the preferred embodiment thereof comprises a tubular member handle 5 adapted to be sleeved on the handle 6 of a conventional garden rake indicated generally by the reference numeral 7; the sleeve 5 being readily movable longitudinally of the rake handle 6.

A substantially U-shaped frame 8 is provided, and the legs or sides 9 of the frame are braced through the medium of a cross-bar 10.

Intermediate the bight of the frame 8 and the brace-bar 10 the legs or sides 9 of the frame are notched as at 11 and in the region of the notches 11 have bolted or otherwise secured thereto as at 12 U-shaped bearing straps 13 and through the medium of which said legs or sides 9 of the frame are pivoted to the frame members of the rake head 14.

A plate 15 is provided of suitable dimensions and having openings spaced to correspond with the spacing of the teeth 16 of the rake and adapted to receive the teeth, and the plate is arranged on the teeth as shown in Figures 1, 2 and 3.

The plate 15 is connected to the frame 8 through the medium of a substantially U-shaped pusher bar 17.

As shown, the bar 17 has the bight portion thereof journaled in openings 18 provided therefor in the free extremities of the legs or sides 9 of the frame 8, and at their extremities the legs of the pusher bar 17 are flattened and angularly offset as at 19. The terminals 19 of the legs of the pusher bar 17 are apertured to accommodate rivets or other fastening elements through the medium of which said terminals of the legs are positively secured to the cleaner plate 15.

The handle 5 of the attachment is connected to the bight of the pusher bar 17 through the medium of a pair of links 20. The links 20 at one end are apertured to accommodate the bight of the pusher bar 17 and adjacent to said end are rigidly secured together in spaced parallelism through the medium of short cross-bars 21 as shown in Figure 2.

The links 21 are pivoted to the handle 5 at one end of the handle through the medium of nut-equipped bolts 22, and as best shown in Figure 4 the handle 5, to accommodate the heads of the bolts 22 have portions pressed laterally outwardly therefrom to provide hollow formations 23 in which the heads of the bolts 22 seat.

To maintain the apertures provided in the bar 15 in alignment with the teeth 16 in the event the bar 15 is pushed far enough to clear the ends of the teeth, and thus permit ready re-engagement of the bar 15 with the teeth 16, there is provided a guide member indicated generally by the reference numeral 24.

The guide member 24 is in the form of a plate provided at one longitudinal edge thereof with a base or attaching flange 25 apertured as shown to accommodate rivets or other fastening elements through the medium of which the guide member is rigidly secured to the plate 15 intermediate the ends of the latter.

At the opposite ends thereof the guide member 24 is provided with integral semi-cylindrical teeth-engaging sleeves 26 that are tapered as shown, being flared at their upper ends to facilitate initial engagement of the guide member with the tines or teeth of the rake; the sleeves 26 acting to guide the plate 15 to the end that upon return movement of the plate 15 after clearing the ends of the tines the apertures in the plates will align with the tines of the rake thereby insuring re-engagement of the plate 15 with the tines without requiring the attention of the user.

It will be seen that with the device applied to the rake it will in no wise interfere with the ordinary use of the implement. When, however, it is desired to clear the tines or teeth of the rake of accumulations of twigs, leaves, and the like, all the operator needs to do is to push on the handle 5 to shift the same along the handle 6 of the rake toward the head end 14 of the rake. This movement of the handle 5 will be transmitted through the links 20 to the frame 8 causing the latter to rotate in a counter-clockwise direction. Such movement of the frame 8 is transmitted through the push bar 17 to the cleaner plate 15 causing the latter to move from the position shown in Figure 3 towards the free ends of the tines or teeth 16 of the rake to remove any accumulation therefrom. A movement of the handle 5 in the opposite direction will lift the plate into the position of Figures 1 and 3.

However, with this device the handle 5 may be pushed forwardly far enough so that the plate 15 will completely clear the tines or teeth 16 to insure a complete removal of accumulation; the guide 24 permitting such clearing of the teeth by the plate 15 while at the same time the sleeves 26 of the guide will maintain contact with the extremities of teeth 16 adjacent thereto and accommodated thereby. Consequently the sleeves 16 of the guide will cooperate with such teeth to the extent that when the handle 5 is shifted in a direction to retract the plate 15, said plate will be held so that the apertures therein will maintain alignment with the tines 16 thus permitting the engagement of the plate 15 with the tines or teeth without requiring the particular attention of the user.

It is thought that a clear understanding of the construction, manner of application, operation and use of a rake-cleaner attachment embodying the features of the present invention will be had without a more detailed description thereof.

Having thus described the invention what is claimed as new is:

1. A cleaner attachment for rakes comprising a handle member adapted to be sleeved onto the handle of a rake to shift longitudinally of said rake handle, an apertured cleaner plate adapted to be mounted on the teeth of the rake to move longitudinally of such teeth, a substantially U-shaped frame having its limbs extending forwardly and said limbs intermediate the ends thereof being equipped for pivotal attachment to the head of a rake for swinging movement relative thereto, a pusher bar of U-shape with its bight pivotally connected with the ends of the limbs of the U-shaped frame, means for connecting the ends of the limbs of the pusher bar with the cleaner plate, links pivoted at one end to the bight of the pusher bar and pivoted at their other ends to the handle member.

2. A cleaner attachment for rakes comprising a handle member adapted to be sleeved onto the handle of a rake to shift longitudinally of said rake handle, an apertured cleaner plate adapted to be mounted on the teeth of the rake to move longitudinally of such teeth, a substanially U-shaped frame having the sides thereof equipped for pivotal attachment to the head of a rake for swinging movement relative thereto, a pusher bar connecting said frame with said cleaner plate, and links pivoted at one end thereof to the tubular handle of the attachment and at a second end thereof pivotally connected with said frame and pusher bar for transmitting movement of the tubular handle to said frame and pusher bar for shifting the cleaner plate relative to the teeth of a rake, and a guide member mounted on said cleaner bar and engageable with some of the teeth of the rake for guiding the cleaner bar in its movement relative to the teeth of the rake, and for maintaining engagement with the teeth of the rake when said cleaner bar is shifted a distance clearing the ends of the teeth of the rake.

3. A guide member for use in maintaining the cleaner plate of a rake-cleaning attachment when in a position clear of the teeth of the rake relative to the teeth of the rake as to facilitate re-engagement of the plate with such teeth; said guide member comprising a body plate provided for direct attachment to the cleaning plate and equipped at the opposite ends thereof with semi-cylindrical sleeves flaring in a direction away from the cleaner plate.

KENNETH W. McMILLER.